United States Patent [19]

Kinoshita

[11] Patent Number: 5,021,807
[45] Date of Patent: Jun. 4, 1991

[54] APPARATUS FOR ELECTROPHOTOGRAPHY REPRESENTING HALF-TONES

[76] Inventor: Koichi Kinoshita, 34-13, Nishi-Kusabuka-Cho, Shizuoka-Shi, Shizuoka-Ken, Japan

[21] Appl. No.: 431,465

[22] Filed: Nov. 2, 1989

[30] Foreign Application Priority Data

Mar. 2, 1989 [JP] Japan ..................... 1-50571

[51] Int. Cl.$^5$ ............... G01D 9/42; G01D 15/14
[52] U.S. Cl. ................................ 346/108; 358/298
[58] Field of Search ........... 355/202, 327; 346/108, 346/109, 160, 160.1; 358/298, 300

[56] References Cited

U.S. PATENT DOCUMENTS

| | | | |
|---|---|---|---|
| 3,982,253 | 9/1976 | Goshima et al. | 346/108 X |
| 4,251,821 | 2/1981 | Kimura | 346/108 |
| 4,347,523 | 8/1982 | Ohara | 346/108 |
| 4,375,063 | 2/1983 | Kitamura | 346/108 |
| 4,768,043 | 8/1988 | Saito et al. | 346/160 X |
| 4,812,861 | 3/1989 | Sasaki et al. | 346/108 X |

Primary Examiner—Donald A. Griffin
Attorney, Agent, or Firm—Marmorek, Guttman & Rubenstein

[57] ABSTRACT

An electrophotographic printing apparatus capable of printing continous half-tone images comprises a photoconductive element on which a latent image is to be formed, a laser light beam light source for projecting a beam spot on the photoconductive element, and a driving circuit connected to the laser beam light source for varying the power output of the laser beam light source. The photoconductive element is a digital photoconductive member that is characterized by undergoing a transistion from a first substantially constant surface potential to a second substantially constant surface potential only in regions where it is illuminated by light above a predetermined threshold level. A density filter is interposed between the laser beam light source and the photoconductive element so that the beam spot projected onto the photoconductive element has a predetermined light intensity distribution with the light intensity being highest near the central portion of the beam spot and rapidly decreasing away from the central portion. Because of the unique properties of the photoconductive element, only those portions of the beam spot which have a light intensity above the threshold level will form a latent image spot corresponding to the beam spot. Although the beam spot may be fixed in size, the size of the latent image spot may be varied by changing the power output of the laser beam light source, which enables printing of continuous half-tones.

30 Claims, 5 Drawing Sheets

APPARATUS FOR ELECTROPHOTOGRAPHY REPRESENTING HALF-TONES

BACKGROUND OF THE INVENTION

This invention relates to an electrophotographic apparatus, for example, an electrophotographic printer, and a method for readily representing an image to be reproduced in continuous half-tones or gradations.

In prior art electrophotographic printers and copiers, half-tone printing was achieved by reducing the diameter of a bright spot illuminated on a photoconductive member by a source of light. This necessitated, however, an increase in the density of scanning lines so as to increase the density of picture elements in the printed image.

A drawback of this method for electrophotographically printing half-tone images is that when the diameter of the illuminated bright spot is sufficiently reduced, diffraction problems occur. Additionally, as the scan line density increases, the processing speed of the electrophotographic apparatus slows. Many attempts have been made to overcome these problems associated with the prior art techniques of electrophotographically printing half-tone images by reducing the diameter of the illuminated bright spot. However, until today, these attempts have been unsuccessful.

SUMMARY OF THE INVENTION

It is an object of this invention to provide a novel electrophotographic apparatus and method for printing continuous half-tone images which do not have the problems mentioned above.

This object is achieved in a novel electrophotographic printing apparatus which combines several operating features. The first feature is that a novel photoconductive member is used. This photoconductive member is characterized by carrying out ON and OFF operations. More specifically, as shown in FIG. 1, the novel photoconductive member is initially charged to a constant surface potential. When the photoconductive member is illuminated with light, only those surface regions which receive light above a certain intensity level are discharged. Those surface regions which do not receive light above that intensity level remain at their initial surface potential. Another way of stating this is that the "$\gamma$" characteristic of a latent image formed on the photoconductive member is very high, having a value of 6 or greater.

A second feature of the inventive electrophotographic printing apparatus is that a bright spot illuminated onto the novel photoconductive member, for example, by a semiconductor laser device, is characterized by a predetermined distribution of light intensity whereby the intensity of light is highest at a central region of the bright spot and diminishes rapidly as one proceeds away from the central region. In a preferred embodiment, a density filter is interposed between the laser light source and the photoconductive member in order to provide the desired distribution of light intensity.

A third feature of the inventive electrophotographic printing apparatus is that means are provided for varying the output of a laser light source. For example, such means may comprise a driving circuit which drives a semiconductor laser device. When a high voltage is applied to the driving circuit, the power output of the laser device is high. The discharged area on the novel photoconductive member will be substantially commensurate with the illuminated bright spot. However, if a lower voltage is applied, only the central area of the bright spot will cause the photoconductive member to discharge. The peripheral area of the bright spot will have too low a light intensity to discharge the photoconductive member.

Thus, in the inventive electrophotographic printing apparatus, a reduced size discharged area or latent image spot is associated with the bright spot. The reduced size discharged area is achieved by varying the power output of the laser device while keeping the size of the bright spot fixed. This enables one to print images in continuous half-tones without reducing the size of the bright spot as in the prior art, and without the problems associated with such prior art techniques.

Accordingly, an inventive electrophotographic printing apparatus capable of printing images in continuous half-tones comprises a photoconductive element having a $\gamma$ of the latent image formed thereon with a value of about 6 or greater, a laser beam light source for projecting a bright spot on the photoconductive element, the bright spot being characterized by a predetermined distribution of light intensity on the photoconductive element, wherein the intensity of light at a central region of the bright spot is much higher than the light intensity at peripheral portions of the bright spot, and a driving circuit associated with the laser beam light source for varying the power output of the laser beam light source. A latent image spot will be formed on the photoconductive element under the bright spot only where the light intensity of the bright spot is above a predetermined threshold value. Thus, the size of the latent image spot associated with the bright spot may be controlled by varying the output of the laser beam light source, whereby continuous half-tone images may be produced by varying the output of the laser device.

In practice, means may be provided for obtaining the predetermined distribution of light intensity of the bright spot. This means may comprise a density filter inserted into the path of the laser beam, the filter having a transmissibility to the laser beam which is highest in the central portion of the filter and which decreases toward the peripheral portion of the filter. Furthermore, the output of the laser beam may be varied in accordance with picture image information.

DESCRIPTION OF PREFERRED EMBODIMENTS

Preferred embodiments of this invention will now be described with reference to the three operating features of the invention described above and with reference to the accompanying drawings.

The first feature of this invention lies in that a photoconductive member is utilized which has an extremely high value of the $\gamma$ characteristic of the latent image formed on the photoconductor. The term "$\gamma$" is used in photography as a measure of the intensity of a conventional silver halide developed image. A corresponding characterization may be used in the art of electrophotography. For purposes of this description, the "$\gamma$ of a latent image" refers to the steepness of the surface potential curves when a latent image is formed on a photoconductive member.

Figure 1:
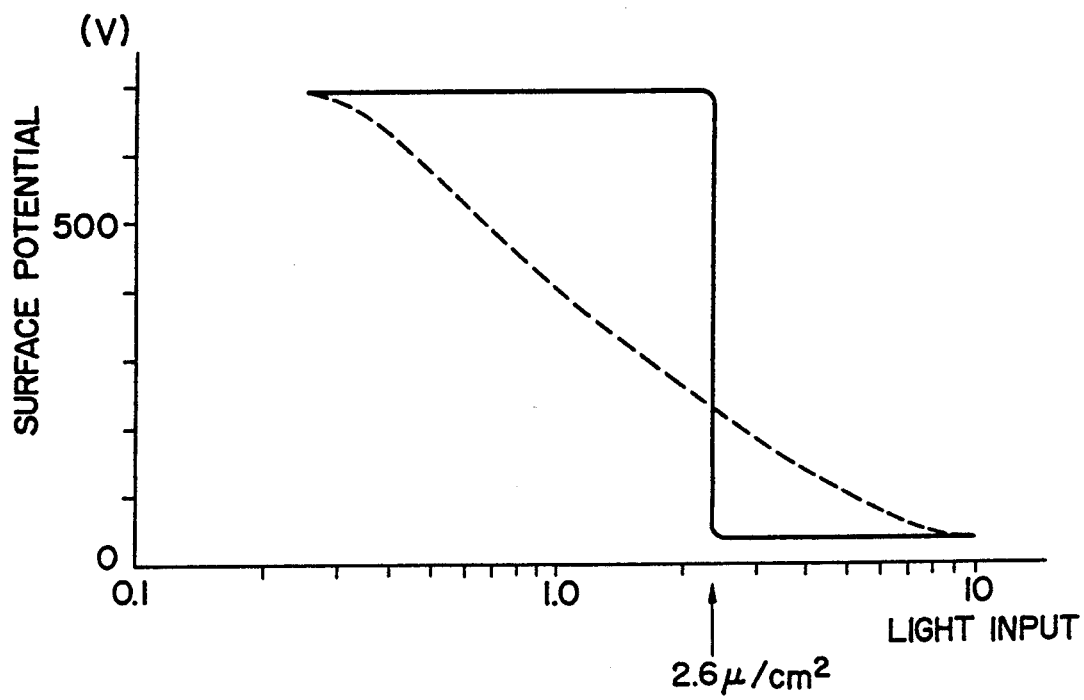
FIG. 1 is a graph showing the photosensitive response of the novel photoconductive member utilized in this invention.

The solid line in FIG. 1 shows the photosensitive response of the novel photoconductive member having a high value of $\gamma$ which is utilized in accordance with the present invention. For comparison purposes, the dashed line in FIG. 1 shows the photosensitive response of a conventional selenium type photosensitive member.

As discussed previously, the photoconductive member utilized in this invention has the peculiar characteristic that the surface potential discharges only when the light quantity or intensity reaches a predetermined threshold value. In other words, the photoconductive member may be described as a "digital" in the sense that it performs ON and OFF operations depending on whether or not it is illuminated with light above a predetermined threshold intensity level (in this example, 2.6 $\mu J/cm^2$). The $\gamma$ characteristic of a latent image formed on the novel photoconductive member is extremely high; for example, it has a value of about 6 or greater. In contrast, the $\gamma$ characteristic of a conventional photoconductive member as shown by the dashed line in FIG. 1 is at most 1 to 2.

A photoconductive member having a high value of $\gamma$ is suitable for reproducing digital picture information. A photoconductive member which may be utilized in the present invention is disclosed in my co-pending application, U.S. Ser. No. 260,683, filed Oct. 20, 1988, now U.S. Pat. No. 4,963,452. According to the method disclosed therein, fine crystals of an intrinsic semiconductor or fine particles of an amorphous semiconductor, each having a mean particle diameter of from 0.01$\mu$ to 0.5$\mu$ are admixed with a highly insulative binder having a volume specific resistivity of higher than $10^{13}$ ohm-cm and coated onto an aluminum cylinder. A specific composition will be described later on. Here it is merely pointed out that the invention disclosed in my aforesaid application uniquely utilizes an avalanche effect that has not previously been utilized in a photoconductive member for conventional electrophotographic processes.

Figure 2:
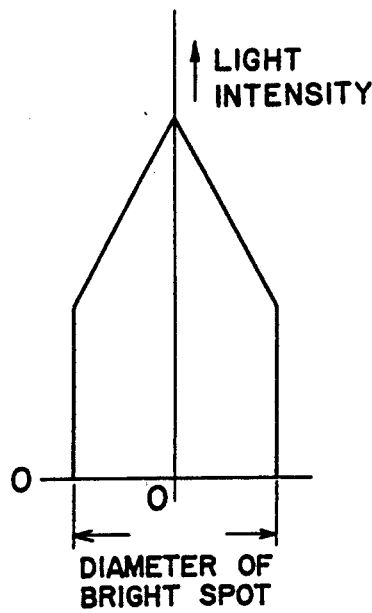
FIG. 2 is a diagrammatic representation of the light intensity distribution of a beam spot.
Figure 3:
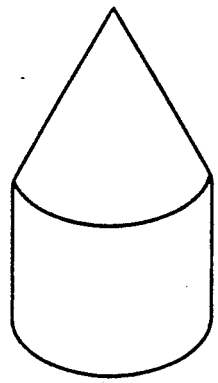
FIG. 3 is a diagrammatic three-dimensional representation of the light intensity distribution of the beam spot shown in FIG. 2.

A second feature of the present invention is that a laser beam spot projected onto the photoconductive member results in a specific light intensity distribution in an image focussing plane of the laser beam. FIG. 2 shows one example of this feature. FIG. 2 is a longitudinal section of a specific light intensity distribution for a particular beam spot. The diameter of the beam spot is shown along the X-axis while the Y-axis denotes the light intensity. It will be observed that the light intensity is highest at the center of the beam spot and rapidly decreases as one proceeds from the center of the beam spot to its periphery. A density filter interposed between the laser beam source and the photoconductive member gives the characteristic shape to the light intensity distribution shown in FIG. 2. FIG. 3 shows a three-dimensional representation of the light intensity distribution of which FIG. 2 is a longitudinal section.

Figure 4:
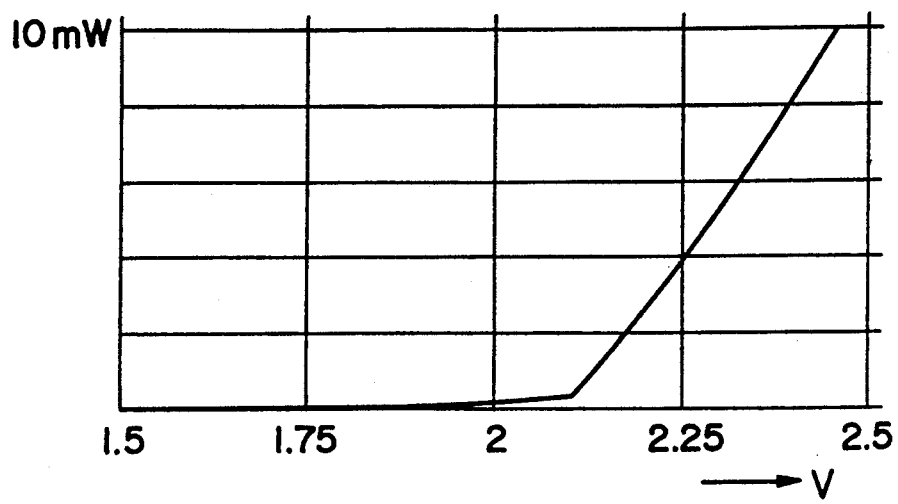
FIG. 4 is a graph showing the relationship between the light output of a solid semiconductor laser device and the voltage applied to a driving circuit.

A third feature of this invention is that the laser output intensity is modulated or varied in accordance with picture image information. FIG. 4 is a graph showing the relationship between the light output (power) of a solid state semiconductor laser device and the voltage applied to a driving circuit. As this Figure clearly shows, the quantity of the emitted light can be varied by controlling the applied voltage.

Figure 5:
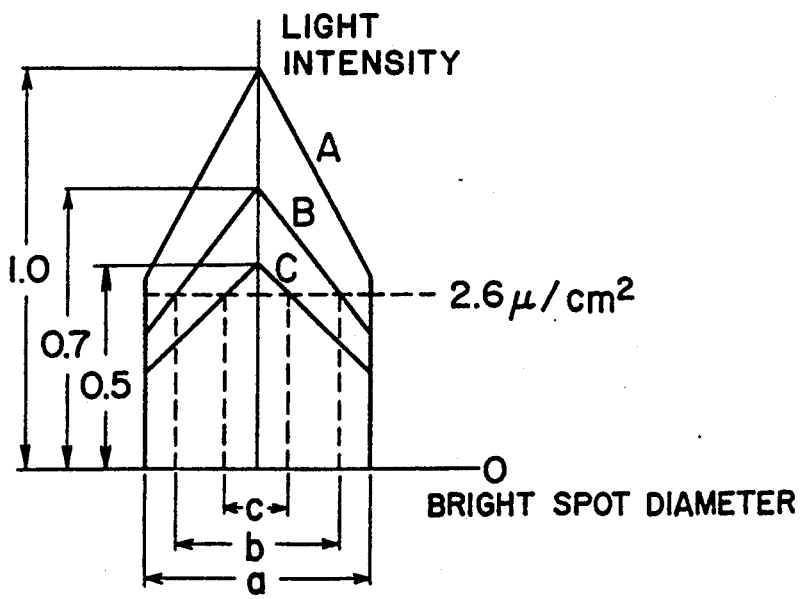
FIG. 5 is a diagrammatic representation of different beam spots projected onto the photoconductive member for different voltages applied to the driving circuit of the laser device.

FIG. 5 shows the light intensity distribution of a bright spot projected onto the photoconductive member when the applied voltage is varied. The lines A, B, and C show sections of the light intensity distribution for the bright spot when the output light intensity from the laser beam light source has relative values of 100%, 70%, and 50%, respectively. The horizontal dashed line labeled 2.6 $\mu J/cm^2$ shows the threshold intensity value which will trigger an avalanche effect in the novel photoconductive member. The dashed vertical lines show the rapid decrease in the surface potential of the novel photoconductive member in regions illuminated with light having an intensity of 2.6 $\mu J/cm^2$. All points above the 2.6 $\mu J/cm^2$ line shown in FIG. 5, will cause the photoconductive member to discharge. In the three cases shown in FIG. 5, the discharged areas under the different beam spots represented by the lines A, B, and C will be solid circles having diameters a, b and c, respectively.

In the three cases shown in FIG. 5, the lines A show the case wherein the output light intensity from the laser device is high enough so that a beam spot having diameter a results in a discharged area (i.e., a latent image spot) also having a diameter a. The lines B show the case wherein the output light intensity is only 70% of that for case A, and wherein a beam spot having a diameter a results in a corresponding latent image spot having a diameter b. The lines C show the case wherein the output light intensity is only 50% of that for case A, and wherein a beam spot with diameter a results in a latent image spot having diameter c. The ratio of the areas of the discharged areas for cases A, B and C are about 1.0, 0.48 and 0.1, respectively.

From the above, it should be understood that when a photoconductive member having a photosensitive response with a $\gamma$ value higher than 6 is illuminated by a laser beam to form a bright spot on the photoconductive member, and the bright spot has a light intensity distribution similar to that shown in FIG. 2, one can carefully control the size of the discharged area or latent image spot on the photoconductive member formed by the bright spot by controlling the power output of the laser beam light source. This result lends itself to printing images in continuous half-tones, as will be described further hereinbelow.

Figure 6A:
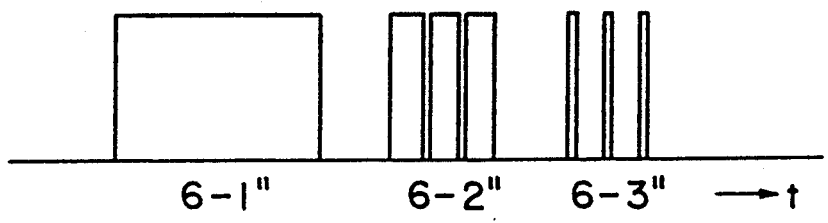
FIGS. 6a, 6b and 6c show examples of the corresponding developed image pattern and latent image pattern, when different voltages are applied to the driving circuit of the laser device.
Figure 6B:
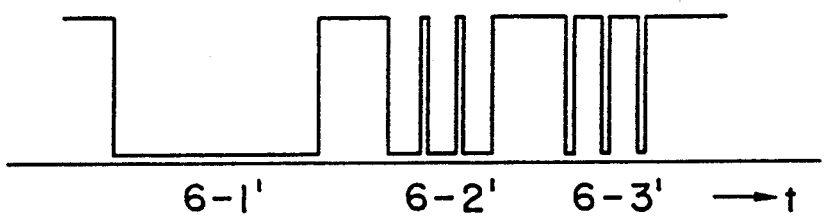
Figure 6C:
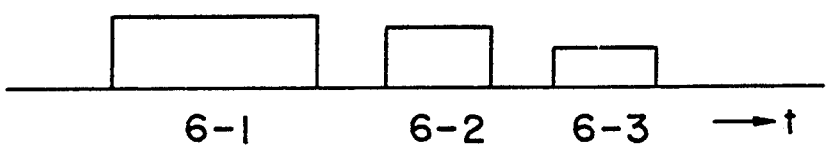

FIGS. 6a, 6b, and 6c show examples of developed image and latent image patterns formed on the surface of the novel photoconductive member when three different voltages are applied to the driving circuit of laser light source. Referring first to FIG. 6c, pulses 6-1, 6-2 and 6-3 show three different voltage states (amplitude and interval), applied to the driving circuit of a laser beam light source. The pulses 6-1', 6-2', and 6-3' in FIG. 6b show the surface potentials formed on the novel photoconductive member by the laser beam light source driven by the voltage pulses 6-1, 6-2, and 6-3. The patterns 6-1'', 6-2'', and 6-3'' in FIG. 6a show the image patterns formed on the photoconductive member when the latent images 6-1', 6-2', and 6-3' are developed. As shown, the degree of blackness of the developed images decreases in the order 6-1', 6-2' and 6-3'.

Figure 7:
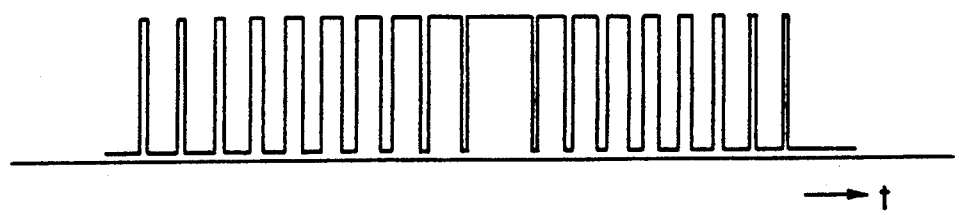
FIG. 7 is a graph showing a pattern of continuously varying half-tones.

FIG. 7 is a graph similar to that in FIG. 6a but showing a continuously varying half-tone. Each one of FIGS. 6a, 6b, and 6c, and also FIG. 7 is depicted as produced with a single scanning line similar to that used in a television camera.

As can be noted from the foregoing description, when the following three conditions are satisfied, it becomes possible to precisely represent half-tone gradations of a picture image without decreasing the diameter of a bright spot or increasing the density of scanning lines:

(1) utilizing a photoconductive member having an extremely high value of $\gamma$ of the latent image, i.e., a $\gamma$ of 6 or greater (the $\gamma$ of prior art photoconductive members being usually 1 to 2);
(2) providing a predetermined light intensity distribution for a bright spot projected onto the photoconductive member by a laser beam; and
(3) varying the output of the laser light source in accordance with picture image information.

Figure 8A:
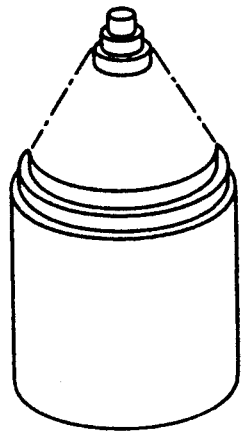
FIGS. 8a through 8d are diagrammatic three-dimensional representations of different light intensity distributions for a bright spot.
Figure 8B:
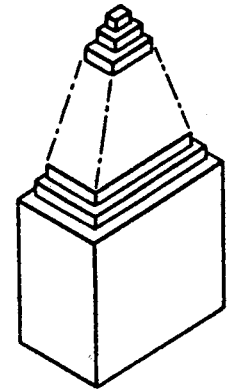
Figure 8C:
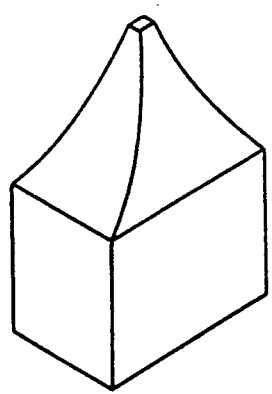
Figure 8D:
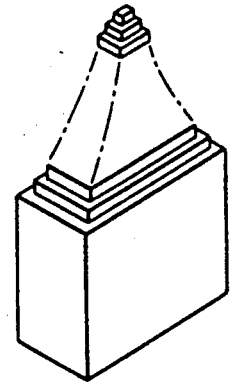

Various means may be provided for carrying out the novel electrophotographic apparatus and method. Examples of such means are as follows:

FIGS. 8a-8d are three-dimensional representations of different predetermined distributions of light intensity for different bright spots. More particularly, FIG. 8a shows a modification of FIG. 3 wherein the light intensity distribution varies stepwisely. FIG. 8a shows the light intensity distribution which accurately represents points on a photoconductive member in accordance with the levels of varying input voltages. FIG. 8b shows the light intensity distribution when the beam spot projected onto the photoconductive member is a square dot. FIG. 8d shows a light quantity distribution for the laser device having an ample output intensity. FIG. 8c shows an example for continuous half-tone variation of a square dot. In FIG. 8c, the three-dimensional light intensity distribution is in the form of a square dot with curved edges. In FIGS. 8b and 8d, unless the laser device has an ample output, it is impossible to vary the light quantity distribution stepwise.

Figure 9:
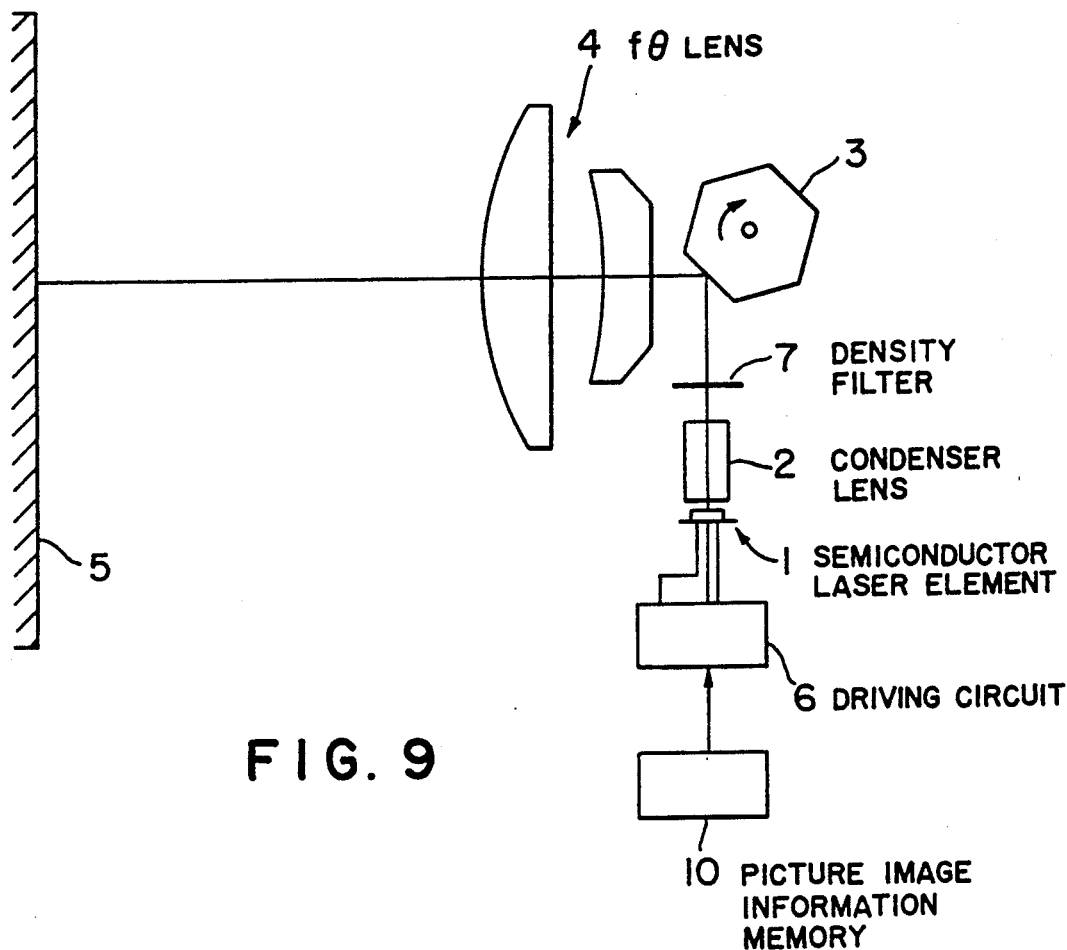
FIG. 9 is a schematic representation of an electrophotographic printing apparatus in accordance with the present invention.

Referring now to FIG. 9, one example of the inventive electrophotographic printing apparatus is shown. The illustrated embodiment includes means for providing a predetermined light intensity distribution of a laser beam spot projected onto the photoconductive member 5, and means for varying the light quantity emitted by a semiconductor laser device.

More particularly, FIG. 9 is a block diagram of an electrophotographic printing apparatus comprising a semiconductor laser element 1 driven by a driving circuit 6, an optical system, for example, a condenser lens 2, a rotating polygonal mirror 3, another optical system comprising a f$\theta$ lens 4, for example, where f represents a focal length and $\theta$ a dispersion angle, the novel photoconductive member 5 onto which a laser beam spot is projected through the lens systems 2,4 and rotary mirror 3, and a density filter 7 which provides a predetermined light intensity distribution. The density filter 7 is located in the output light path of the condenser lens 2.

According to one embodiment of this invention shown in FIG. 9, a memory device 10 storing picture image information in the form of bits is connected to the driving circuit of the semiconductor laser element 1. The contents of the memory device 10 are sequentially read out and supplied to the driving circuit 6. As a consequence, the power output of the laser beam emitted by the semiconductor laser element 1 is varied or modified according to the picture image information stored in the memory device 10, whereby a latent image precisely corresponding to the picture image information can be formed on the surface of photoconductive member 5. The treatment of the toner image, including applying the toner, transfer printing of the toner image, and developing the transfer printed toner image is the same as in conventional electrophotographic machines.

The density filter 7 must be such that a desired light intensity distribution for a beam spot projected onto the photoconductive member 5 will be obtained taking into account the inherent light intensity distribution of the semiconductor laser light emitting element 1. The density filter 7 is such that the intensity of light passing therethrough decreases from the central portion towards the peripheral portion. Since optical systems currently used in laser light systems are carefully designed to take account of wavefront aberration, even when the density filter 7 is inserted into the light path, the light intensity distribution would not be varied greatly in contrast to the filter density distribution.

Figure 10:
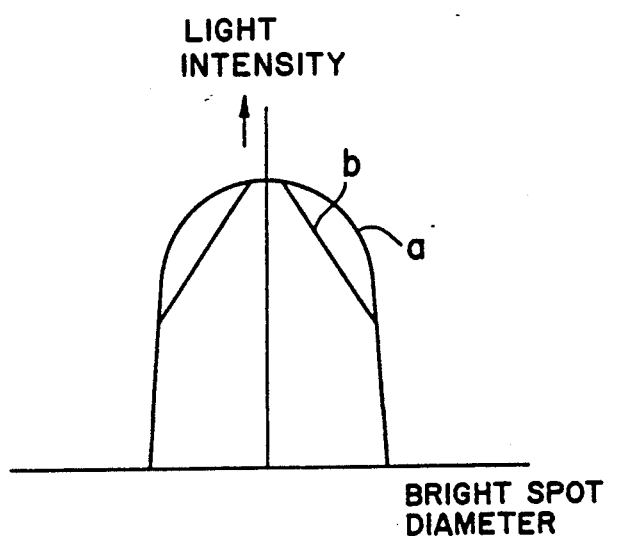
FIG. 10 is another graph showing the distribution of the light intensity in a bright spot.

Since an ordinary laser beam has a Gaussian distribution of light intensity, the peripheral portion ordinarily has a smaller light intensity than the central portion so that a density filter can be prepared relatively readily. If the laser beam has an inherent Gaussian light quantity distribution very close to that required by this invention, i.e., similar to that shown by the curve a in FIG. 10, the object of this invention can be accomplished even when the density filter 7 is omitted from the light path.

A specific embodiment of the invention will now be described.

A photosensitive member having a high value of $\gamma$ of latent image and suitable for use in electrophotography has the following composition:

| | |
|---|---|
| α-type copper phthalocyanine | 10.6 g |
| polyester resin | 36.75 g |
| (P-645, made by Mitsui Toatsu Co.) | |
| melamine resin | 13.8 g |
| (Uban 20-HS, made by Mitsui Toatsu Co.) | |
| cyclohexanone | 170 g |

After mixing together these components in a vibrating type mixer for 2 hours, the resulting mixture was coated onto the surface of an aluminum cylinder having a diameter of 80 mm to form a photoconductor film having a dry thickness of 15μ. The coated mixture was dried at a temperature of 150° C. for two hours in air and then cooled to room temperature so as to obtain the photoconductor 5. When applied with a surface potential of 600 volts and inputted with a laser beam of wavelength 780 nm at an intensity of 2.4 μJ/cm², a rapid light attenuation was observed. The γ of the latent image was measured as being as high as about 100, and the residual potential was found to be about 20 volts.

In a commercially available electrophotographic printer (having a process speed of 115 mm/sec., a photosensitive member with a diameter of 80 mm, and an average diameter of toner particles of 7μ), the photoconductor 5 described above was substituted for the conventional SeAs type photoconductor. The power output of the laser device was increased to 10 mW from 5 mW. The laser device used was a PIN device formed in a GaAlAs materials system.

The light quantity distribution in the bright spot was measured. It was found that the distribution substantially follows a Gaussian distribution although the distribution was somewhat flat as shown by curve a in FIG. 10. For modifying the light quantity distribution, the density filter 7 was provided which gave the light quantity distribution shown by curve b in FIG. 10.

The electrophotographic apparatus was operated using the above described 10 mW laser device and the density filter 7. By varying the voltage applied to the driving circuit of a laser diode in seven steps from 2.25 volts to 2.4 volts, spot images whose magnitude varied in seven corresponding stages were obtained, which means that it was successful in accurately rendering visible dots of varying diameter even though the bright spot had the same diameter as that of a conventional bright spot.

Another advantage of this invention lies in that since a density filter is used, even though a minute spot image is formed, the problem of diffraction can be eliminated. While the example described above disclosed specific means for providing a predetermined light intensity distribution of a bright spot projected onto the photoconductive member and specific means for varying as desired the light output emitted by the light source, this invention is not limited to the means described above and any other suitable means can be used. For example, the function of the density filter 7 can be provided by a window of a laser element adapted to transmit a laser beam.

Where the light quantity of the laser beam is ample and the light quantity distribution is step shaped, the value of γ may be a little smaller than 6.

The advantages of this invention can be realized irrespective of the type of the laser light source. Thus a laser device other than a solid state semiconductor laser device can also be used.

What is claimed is:

1. Apparatus for electrophotographically representing images in half-tones comprising:
   a photoconductor element on which a latent image having a high value of γ of higher than 6 is to be formed;
   a source of laser beam;
   a driving circuit for driving said source of laser beam in accordance with a picture image information;
   a lens system for projecting said laser beam on a surface of said photoconductor element so as to form said latent image; and means for providing a predetermined light quantity distribution in a bright spot of said laser beam projected upon said photoconductive element,
   wherein said lens system comprises a density filter installed in a path of said laser beam, said density filter being constructed such that its laser beam transmissibility decreases from a central portion toward a peripheral portion of said density filter.

2. The apparatus according to claim 1 wherein light quantity distribution of a bright spot of said laser beam projected upon said semiconductor member has a pyramidal configuration, a height thereof varies with voltage applied to said source of laser beam.

3. The apparatus according to claim 2 wherein said pyramidal configuration is stepped.

4. An electrographic printing apparatus capable of printing half-tone images, comprising
   a photoconductive element having a γ of the latent image formed thereon of about 6 or greater,
   a laser beam light source having a power output for projecting a beam spot on the photoconductive element, said beam spot having a predetermined distribution of light intensity on said photoconductive element, said beam spot forming a latent image spot corresponding to said beam spot on said photoconductive element,
   means connected to said laser beam light source for varying the power output of said laser beam light source,
   wherein the size of said latent image spot is varied by varying the power output of said laser beam light source.

5. The apparatus of claim 4 wherein the light intensity of said beam spot is highest at a central region of said beam spot and decreases away from said central region, and wherein said corresponding latent image spot is formed on said photoconductive member only in regions of said beam spot where the light intensity is above a predetermined threshold level.

6. The apparatus of claim 4 further comprising means interposed between said laser beam light source and said photoconductive element for providing said predetermined distribution of light intensity.

7. The apparatus of claim 6 wherein said means for providing said predetermined light intensity distribution comprises a density filter.

8. The apparatus of claim 7 wherein said density filter has a transmissibility to said laser beam which is highest near a central portion of said filter and decreases towards a peripheral portion of said density filter.

9. The apparatus of claim 4 wherein said means for varying the output power of said laser beam light source comprises a driving circuit connected to said laser beam light source.

10. The apparatus of claim 4 further comprising a lens system interposed between said laser beam light source and said photoconductive element for projecting said beam spot on said photoconductive element.

11. The apparatus of claim 10 wherein said lens system comprises a condenser lens, a rotary mirror, and a fθ lens.

12. The apparatus of claim 4 wherein said laser beam light source comprises a semiconductor laser beam element.

13. The apparatus of claim 4 wherein said predetermined distribution of light intensity is a stepped distribution.

14. The apparatus of claim 4 wherein said predetermined light distribution is in the shape of a pyramid.

15. The apparatus of claim 14 wherein said pyramid is stepped.

16. An electrographic printing apparatus for printing continuous half-tone images, comprising
a photoconductive element on which a latent image is to be formed, said photoconductive element having a high value of $\gamma$ of the latent image formed thereon,
a source of laser light having a power output for projecting a beam spot on said photoconductive element, and
means connected to said source of laser light for varying the power output of said laser light source,
said beam spot being characterized by a predetermined distribution of light intensity, said light intensity being highest near a central portion of said beam spot and decreasing away from said central portion,
said photoconductive element have a first substantially constant surface potential in regions of said beam spot where the light intensity is below a predetermined threshold level, said regions undergoing a transition to a second substantially constant surface potential when said light intensity is above said threshold level,
wherein the size of a latent image spot on said photoconductive element corresponding to said beam spot is controlled by varying the power output of said laser light source.

17. The apparatus of claim 16 further comprising means interposed between said source of laser light and said photoconductive element for providing said predetermined distribution of light intensity.

18. The apparatus of claim 17 wherein said means for providing said predetermined light intensity distribution comprises a density filter.

19. The apparatus of claim 18 wherein said density filter has a transmissibility which is highest near a central portion of said filter and decreases towards a peripheral portion of said density filter.

20. The apparatus of claim 16 wherein said means for varying the power output of said source of laser light comprises a driving circuit.

21. The apparatus of claim 16 further comprising a lens system interposed between said source of laser light and said photoconductive element for projecting said beam spot on said photoconductive element.

22. The apparatus of claim 21 wherein said lens system comprises a condenser lens, a rotary mirror, and a f$\theta$ lens.

23. The apparatus of claim 16 wherein said source of laser light comprises a semiconductor laser element.

24. The apparatus of claim 16 wherein said predetermined distribution of light intensity is a stepped distribution.

25. The apparatus of claim 16 wherein said predetermined light distribution is in the shape of a pyramid.

26. The apparatus of claim 25 wherein said pyramid is stepped.

27. A method for electrophotographically printing continuous half-tone images, comprising
illuminating a photoconductive element with a beam spot of light, said beam spot being characterized by a predetermined distribution of light intensity, said light intensity being highest in a central portion of said beam spot and decreasing away from said central portion,
said photoconductive element undergoing a transition from a first substantially constant surface potential to a second substantially constant surface potential in regions of said beam spot where the light intensity is above a threshold level,
forming a latent image spot corresponding to said beam spot on said photoconductive element in regions of said beam spot where the light intensity is above said threshold level, and
varying the power associated with said beam spot of light to control the size of said latent image spot.

28. The method of claim 27 further comprising shaping the distribution of light intensity of said beam spot so that said beam spot has said predetermined distribution of light intensity.

29. The method of claim 28 wherein said distribution of light intensity of said beam spot is shaped to a stepped configuration.

30. The method of claim 28 wherein said distribution of light intensity of said beam spot is shaped to a pyramided configuration.

* * * * *

UNITED STATES PATENT AND TRADEMARK OFFICE
CERTIFICATE OF CORRECTION

PATENT NO. : 5,021,807
DATED : June 4, 1991
INVENTOR(S) : Koichi KINOSHITA

It is certified that error appears in the above-identified patent and that said Letters Patent is hereby corrected as shown below:

On the cover page, next to the figure, change "$2.6\mu/cm^2$" to -- $2.6\mu J/cm^2$ --.

On Fig. 1, change "$2.6\mu/cm^2$" to -- $2.6\mu J/cm^2$ --.

On Fig. 5, change "$2.6\mu/cm^2$" to -- $2.6\mu J/cm^2$ --.

Signed and Sealed this

Twenty-ninth Day of June, 1993

MICHAEL K. KIRK

*Attest:*

*Attesting Officer*   *Acting Commissioner of Patents and Trademarks*